Patented July 14, 1953

2,645,628

UNITED STATES PATENT OFFICE 2,645,628

VINYL POLYSILOXANE COMPOSITIONS

Dallas T. Hurd, Burnt Hills, N. Y., assignor to General Electric Company, a corporation of New York No Drawing. Application March 30, 1951, Serial No. 218,537

6 Claims. (Cl. 260—46.5)

This application is a continuation-in-part of my earlier filed application, Serial No. 598,928, filed June 11, 1945, and assigned to the same assignee as the present invention, the aforesaid application now being abandoned.

The present invention relates to resinous or polymerizable polysiloxane compositions containing both silicon-bonded vinyl radicals and silicon-bonded monovalent hydrocarbon radicals selected from the group consisting of alkyl, aryl, aralkyl, and alkaryl radicals, and to copolymers containing such polysiloxanes.

The term "polysiloxane," as used herein, refers to compositions of matter having a skeletal structure consisting essentially of alternate atoms of silicon and oxygen. The structures resulting from the silicon-oxygen-silicon linkages may be either of a cyclic or straight-chain or branched-chain type, or any combination of one or more of these types resulting from cross-linking of the basic units at one or more points by additional silicon-oxygen-silicon linkages to form a network structure.

Various hydrocarbon-substituted polysiloxane compounds have heretofore been known. Many of these have been described or referred to, for example, in Rochow U. S. Patents 2,258,218–222, assigned to the same assignee as the present invention. In these known polysiloxanes, particularly the resinous polysiloxanes such as are described in the Rochow patents mentioned above, all of the silicon-bonded monovalent hydrocarbon radicals are saturated aryl or saturated alkyl radicals, the cross-linking necessary for the formation of solid or resinous materials being obtained by Si-O-Si linkages.

The polysiloxanes of the present invention are distinguished from the polysiloxanes known heretofore by the fact that part of the silicon-bonded hydrocarbon radicals, particularly the saturated hydrocarbon radicals, are substituted by short-chain, monovalent, terminally unsaturated alkenyl radicals, specifically, vinyl radicals, so that further polymerization of the polysiloxanes can be effected through these unsaturated radicals. The vinyl radicals may be substituted on silicon atoms which have no other organic radical attached thereto, or the vinyl radicals may be attached to silicon atoms which also contain a non-vinylic hydrocarbon radical, e. g., methyl, phenyl, etc. By substitution of the vinyl radicals for minor proportions of the silicon-bonded monovalent hydrocarbon radicals of the known polysiloxanes, particularly useful products can be obtained having the characteristic properties of the polysiloxane structure and the added advantage resulting from the capacity of the vinyl substituents to undergo organic polymerization with the formation of larger molecules. In general, although allyl groups attached to silicon appear to be more reactive toward polymerization than the vinyl groups with which the present invention is concerned, it has been found that under equivalent molar concentrations of vinyl and allyl groups, the remaining structure of the organopolysiloxane being essentially the same, the heat-stability of organopolysiloxanes containing vinyl groups is better than the heat-stability of organopolysiloxanes in which allyl groups are present in place of vinyl groups.

The vinyl-substituted silicon halides which are used to make the organopolysiloxanes herein described and claimed may be prepared in various ways. For example, a vinyl halide, for instance, vinyl chloride or vinyl bromide, may be reacted with heated silicon in the presence of a copper catalyst in accordance with the process described and claimed in my U. S. Patent 2,420,912, issued May 20, 1947, and assigned to the same assignee as the present invention. Alternatively, an ethyl silicon halide, such as ethyltrichlorosilane, or ethylmethyldichlorosilane can be chlorinated in the ethyl radical thereof, for example, by means of sulfuryl chloride, and the chloroethyl groups subjected to dehydrochlorination to form the corresponding vinyl-substituted silane. This may be accomplished, for example, by heating the chloroethyl derivative with an excess of quinoline or other suitable tertiary amine.

The principal advantages of the present invention become more apparent from a consideration of the method by which the polysiloxanes are usually prepared. Polysiloxanes are dehydration products of hydrocarbon-substituted silanols which, in turn, are normally prepared by hydrolysis of silane derivatives or mixtures of such silanes of the formula $R_nSiX_{4-n}$ wherein $n$ is a number from 1 to 3, R represents a monovalent hydrocarbon radical and X represents a hydrolyzable group, such as a halogen atom, an alkoxy radical or the like. A compound of the formula $SiX_4$ where X is a hydrolyzable group as above, such as silicon tetrachloride, may also be present to introduce greater functionality and cross-linking during hydrolysis. In the preparation of polysiloxanes, particularly the resinous and other high molecular weight materials, the characteristics of the fully condensed products are primarily dependent on the particular silane or silanes employed as starting materials, i. e., the nature and average number of silicon-bonded R groups so that the final products will be either liquid or resinous depending on the average R/Si ratio of the silicol or silicols. Except for certain treatments believed to result in a rearrangement of the condensation products or a removal of R groups, the main, and, in general, the only reaction involved in the preparation of the polysiloxanes subsequent to the hydrolysis of the starting materials is the condensation or intercondensation of silicols. Hence, control of the formation of the polysiloxanes wherein R is, e. g., an alkyl or aryl group, essentially depends on the degree to which the condensation reactions can be controlled.

The present invention offers an additional means for converting polysiloxanes to higher molecular weight products. For example, in accordance with the present invention, it is possible to prepare relatively stable polysiloxanes in a completely or substantially completely condensed state which can be converted to higher molecular weight products by effecting polymerization through the vinyl groups attached to silicon atoms. Alternatively, the final setting up of partially condensed resin-forming polysiloxanes, which is a relatively slow process when obtained only by means of the condensation reaction, can be greatly accelerated by the concomitant polymerization of silicon-bonded vinyl radicals. In addition to their shorter curing time, as compared with the known alkyl or araryl polysiloxanes, the vinyl-substituted polysiloxanes possess the further advantages of curing at lower temperatures and of losing less weight during cure due to evaporation of low molecular weight components.

When the alkenyl, that is, vinyl content, is less than 25 per cent based on the molar content of the vinyl groups, the heat stability of the cured product is, unexpectedly, comparable with that of the corresponding products containing only non-vinylic or saturated groups as, for instance, containing only alkyl (e. g., methyl) groups or aryl (e. g., phenyl) groups. The presence of the terminally unsaturated vinyl radical also permits the ready copolymerization of the polysiloxanes of the present invention with various monomeric polymerizable organic materials containing a terminally unsaturated polymerizable $CH_2=C<$ grouping such as, for example, diallyl phthalate, styrene, vinyl chloride, acrylic acid, methacrylate acid, methyl methacrylate, ethyl acrylate, as well as other derivatives of acrylic acid and methacrylic acid, for instance, their other esters, their amides, their nitriles, etc.

Further advantages of the present invention will become apparent to those skilled in the art from a consideration of the following illustrative examples. In the examples below is illustrated the preparation of preferred hydrocarbon-substituted polysiloxane resins in which a minor proportion of the silicon-bonded hydrocarbon radicals are vinyl radicals.

*Example 1*

A mixture of 19.2 volumes of dimethyldichlorosilane and 2.8 volumes of vinyl methyldichlorosilane, $(CH_2=CH)(CH_3)SiCl_2$, was dissolved in 100 volumes of diethyl ether, and the solution was hydrolyzed in an amount of water in excess of that calculated as being required for complete hydrolysis of all the chlorosilanes in the solution. After separation of the ether layer and removal of the ether solvent, 0.1 gram of benzoyl peroxide was added to the resulting liquid product which had a hydrocarbon to silicon ratio of two and which contained, in the copolymer chain, 20 mol per cent vinyl methyl siloxane units, $(CH_2=CH)(CH_3)SiO$, and 80 mol per cent dimethyl siloxane units. This mixture was then heated at 100° C. for 24 hours and then at 150° C. for 72 hours. At the end of this period of heating the liquid product had set to a hard, clear resin.

In the above Example 1, it will be noted that the hydrolysis and condensation products had an R/Si ratio (hydrocarbon-to-silicon ratio) such that no cross-linking by means of silicon-oxygen-silicon bonds is possible. Thus, if the vinyl groups had not formed a portion of the total hydrocarbon or R group content of the siloxane condensation product, a resin would not have been obtained under the conditions specified but, rather, oils would have been formed. The following examples disclose the preparation of polysiloxane resins in which some of the necessary cross-linking is obtained by the oxygen bridge of the Si-O-Si linkage, that is, by having the R/Si ratio less than 2, and the remainder of the cross-linking by polymerization through vinyl groups. In this connection, a determination of the functionality of any reaction mixture must take into account both the silicon-bonded hydroxyl (silanol) groups and the silicon-bonded vinyl groups. For example, whereas the silanol $R_3SiOH$ (where R is a monovalent hydrocarbon radical), is only monofunctional if R is an alkyl or aryl group, it has a greater functionality if one, two, or all of the R groups are vinyl groups.

*Example 2*

A mixture of 19.2 volumes of dimethyldichlorosilane and 5.2 volumes of vinyltrichlorosilane was dissolved in 100 volumes of diethyl ether and the resulting solution was hydrolyzed by adding it to an amount of water which was substantially in excess of that required for complete hydrolysis of all the silicon-bonded chlorine atoms. After separation of the ether layer and removal of the ether solvent, a liquid polysiloxane was obtained containing in an intercondensed state about 20 mol per cent monovinyl silicone or siloxane units and 80 mol per cent dimethyl silicone or siloxane units. This liquid was heated to 100° C. for 24 hours, then at 150° C. for 72 hours during which time the liquid set to a hard, transparent resin. It is to be noted that while this resin had a total R-to-Si ratio of 1.8, its ability to form cross-linked polymers of comparable properties was substantially the same as an alkyl or aryl polysiloxane having an R/Si (where R has the meaning given above) ratio of only 1.6.

*Example 3*

A mixture of 19.2 volumes of dimethyldichlorosilane, 3.5 volumes of methyltrichlorosilane, and 1.3 volumes of vinyltrichlorosilane was dissolved in diethyl ether and hydrolyzed in an excess of water, as was done in Example 1. After removal of the solvent, 0.1 gram benzoyl peroxide was added to the resulting liquid (total R/Si ratio=1.8, $CH_3$/Si ratio=1.75, 5 mol per cent copolymerized monovinyl siloxane, 95 mol per cent copolymerized monomethyl and dimethyl siloxane units) which was then heated at 100° C. for 24 hours, then at 150° for 72 hours. The final product was a hard, clear, cross-linked resin which was substantially infusible and insoluble at elevated temperatures.

*Example 4*

A mixture of 9.8 volumes of dimethyldichlorosilane, 13 volumes of diphenyltrichlorosilane, 7 volumes of phenyltrichlorosilane, and 2.6 volumes of vinyltrichlorosilane, was dissolved in 100 volumes of diethyl ether and was hydrolyzed by pouring the ethereal solution into an amount of water in excess of that required for complete hydrolysis of all the silicon-bonded chlorine in the chlorosilane. After separation of the water layer and removal of the ether solvent, the resulting liquid which contained 10 mol per cent copolymerized monovinyl siloxane units, 40 mol per cent copolymerized dimethyl siloxane units, and a 50 mol per cent total of copolymerized monophenyl and diphenyl siloxane units, was heated at 100° C. for 24 hours and then at 200° C. for 48 hours during which time the liquid became more viscous so that when it was cooled to room temperature it set to a very hard, thermoplastic resin. The R/Si ratio for this resin was 1.7. The ratio of total methyl and phenyl groups to silicon atoms was about 1.6. Further heating of this thermoplastic material with cure accelerators, such as benzoyl peroxide or tertiary butyl perbenzoate would give a harder resin having a higher softening point.

It will, of course, be apparent to those skilled in the art that instead of the vinyl methyl polysiloxanes, or vinyl methyl phenyl polysiloxanes described above, other organopolysiloxanes containing silicon-bonded vinyl radicals, as well as different hydrocarbon (or R) radicals bonded to the silicon atoms by carbon-silicon linkages, may be present as, for instance, other alkyl radicals, e. g., ethyl, propyl, isopropyl, butyl, hexyl, etc.; other aryl radicals as, e. g., biphenyl, naphthyl, etc. radicals; aralkyl radicals, e. g., benzyl, phenylethyl, etc.; alkaryl radicals as, e. g., tolyl, ethylphenyl, xylyl, etc., radicals.

The vinyl hydrocarbon-substituted polysiloxanes herein disclosed and claimed may also be copolymerized with other polymerizable organic compounds, such as, for example, methacrylate esters, styrene, chlorostyrene, diallyl phthalate, acrylonitrile, vinyl pyridine, etc. Specific copolymers of methacrylate esters and a methyl vinyl polysiloxane in which the silicon atoms of the poly siloxane are connected to both a methyl and vinyl group, are described and claimed in Roedel Patent 2,420,911 issued May 20, 1947, and assigned to the same assignee as the present invention. The copolymers of methyl vinyl polysiloxane with styrene are quite plastic when the proportions of the polysiloxane are less than 50 per cent, while hard, tough, thermoplastic products are obtained by the copolymerization of major proportions of styrene or chlorostyrene with minor proportions of a methyl vinyl polysiloxane. Clear copolymers of methyl vinyl silicone and acrylonitrile or diethyl maleate have also been prepared. Hard, tough, somewhat opaque products have been obtained by the copolymerization of vinyl carbazole and a methyl vinyl polysiloxane. The amount of nonsilicon-containing copolymerizable monomer which can be used in preparing the compositions described above may, of course, be varied within wide limits. Depending on the properties desired for the final product, the polymerizable non-silicon containing compound may vary, for example, from about 1 to 99 per cent by weight, preferably from 25 to 75 per cent by weight, based on the total weight of the latter and the vinyl hydrocarbon-substituted polysiloxane.

In effecting polymerization of the vinyl hydrocarbon-substituted polysiloxanes herein described, various catalysts, in addition to those which have been disclosed above, may be used, such as, for instance, tertiary butyl hydroperoxide-1, di-(tertiary butyl) diperphthalate, etc. The concentrations of the catalysts may be varied within wide limits but generally are preferred to be equal to from about 0.1 to 5 per cent, by weight, based on the weight of the polymerizable composition which may be either the vinyl hydrocarbon-substituted polysiloxane alone or combinations of the latter with other copolymerizable non-silicon-containing monomeric materials.

From the above description, there have been provided resins or resinifiable siloxanes containing an average of from 1 to not more than 3 silicon-bonded hydrocarbon radicals per silicon atom, at least some of the hydrocarbon radicals being vinyl groups. The preferred resins are those obtained when vinyl groups are substituted for up to 25 per cent of the total silicon-bonded hydrocarbon groups, for example, total alkyl or aryl groups and vinyl groups, in polysiloxanes having an R/Si ratio of from about 1.2 to 2.0. Best results from the standpoint of the heat stability of the hardenable or hardened products, appear to be obtained when the vinyl content is limited to less than 25 per cent, preferably from about 1 to 20 per cent, especially in the range of from about 5 to 20 per cent, of the total hydrocarbon or R content of the polysiloxane, and when the total R/Si ratio is from about 1.4 to 1.8.

The weight loss during removal of the solvent and subsequent heating or curing of the vinyl-substituted siloxanes is in all cases substantially smaller than with the previously known siloxances in which none of the R groups are inherently polymerizable, as, for example, alkyl or aryl groups. Resinous vinyl polysiloxanes having R/Si ratios less than 1.8 and in which from 10 to 20 per cent of the silicon-bonded hydrocarbon radicals were vinyl groups have shown no signs of crazing or cracking when the cured films have been heated for as long as 175 hours at 200° C. On the other hand, organopolysiloxanes containing only unsaturated hydrocarbon groups attached to the silicon atoms by carbon-silicon bonds, particularly vinyl groups, show early crazing when heated for various lengths of time at 200° C.

It has been found that the vinyl polysiloxanes herein described and claimed have greater heat stability and chemical stability than similar organopolysiloxanes in which the vinyl groups present therein are replaced by allyl radicals. In addition, whereas silicon-bonded allyl radicals may be caused to cleave in the presence of concentrated sulfuric acid or strong alkali to give such by-products as propylene, under similar conditions the amount of cleavage of silicon-bonded vinyl radicals is considerably less, thus illustrating the improved chemical stability of the vinyl polysiloxanes herein described over allyl polysiloxanes containing other kinds of hydrocarbon groups, i. e., non-polymerizable hydrocarbon groups, attached to the silicon atoms in the polysiloxane chain.

The heat-hardenable polysiloxanes of the present invention alone or mixed with solvents, pigments, driers, etc., can be employed, for example, as varnishes or enamels for application as protective, decorative or insulating coatings which, when applied to a base member and air-dried or baked with or without vinyl polymerization catalysts, have a high degree of resistance to heat and atmospheric conditions. Such compositions can also be employed as fillers or binders for coil structures, or in the manufacture of cast, pressed or moulded articles in a manner well known in the plastic art.

What I claim as new and desire to secure by Letters Patent of the United States is:

1. A resinous composition of matter comprising a polymerizable monovalent hydrocarbon-substituted polysiloxane wherein the hydrocarbon radicals consist of both (a) vinyl radicals, and (b) monovalent radicals selected from the class consisting of alkyl and aryl radicals, all the aforementioned hydrocarbon radicals being present in the ratio of from 1.2 to 1.8 total hydrocarbon radicals per silicon atom and are directly attached to the polysiloxane silicon atoms by carbon-silicon linkages, the said vinyl radicals comprising from 1 to 20 per cent of the total number of silicon-bonded hydrocarbon radicals.

2. A resinous composition of matter comprising a polymerizable monovalent hydrocarbon-substituted polysiloxane wherein the hydrocarbon radicals attached thereto by carbon-silicon linkages consist of both (a) vinyl radicals, and (b) alkyl radicals, all the aforementioned hydrocarbon radicals being present in the ratio of from about 1.2 to 1.8 total hydrocarbon radicals per silicon atom and the vinyl radicals comprise from 1 to 20 per cent of the total number of silicon-bonded hydrocarbon radicals.

3. A resinous composition of matter comprising a polymerizable monovalent hydrocarbon-substituted polysiloxane wherein the hydrocarbon radicals attached thereto by carbon-silicon linkages consist of both (a) vinyl radicals, and (b) aryl radicals, all the aforementioned hydrocarbon radicals being present in the ratio of from about 1.2 to 1.8 total hydrocarbon radicals per silicon atom and the vinyl radicals comprise from 1 to 20 per cent of the total number of silicon-bonded hydrocarbon radicals.

4. A resinous composition of matter comprising a polymerizable monovalent hydrocarbon-substituted polysiloxane wherein the hydrocarbon radicals attached thereto by carbon-silicon linkages consist of both (a) vinyl radicals, and (b) methyl radicals, all the aforementioned hydrocarbon radicals being present in the ratio of from about 1.2 to 1.8 total hydrocarbon radicals per silicon atom and the vinyl radicals comprise from 1 to 20 per cent of the total number of silicon-bonded hydrocarbon radicals.

5. A resinous composition of matter comprising a polymerizable monovalent hydrocarbon-substituted polysiloxane wherein the hydrocarbon radicals attached thereto by carbon-silicon linkages consist of both (a) vinyl radicals, and (b) phenyl radicals, all the aforementioned hydrocarbon radicals being present in the ratio of from about 1.2 to 1.8 total hydrocarbon radicals per silicon atom and the vinyl radicals comprise from 1 to 20 per cent of the total number of silicon-bonded hydrocarbon radicals.

6. A resinous composition of matter comprising a polymerizable monovalent hydrocarbon-substituted polysiloxane wherein the hydrocarbon radicals consist of both (a) vinyl radicals, and (b) both methyl and phenyl radicals, all the aforementioned hydrocarbon radicals being present in the ratio of from 1.2 to 1.8 total hydrocarbon radicals per silicon atom and are directly attached to the polysiloxane silicon atoms by carbon-silicon linkages, the said vinyl radicals comprising from 1 to 20 per cent of the total number of silicon-bonded vinyl, methyl, and phenyl radicals.

DALLAS T. HURD.

References Cited in the file of this patent

UNITED STATES PATENTS

| Number | Name | Date |
|---|---|---|
| 2,155,591 | Garvey | Apr. 25, 1939 |
| 2,273,891 | Pollack et al. | Feb. 24, 1942 |
| 2,426,121 | Rust et al. | Aug. 15, 1947 |
| 2,427,640 | Whitehill et al. | Sept. 16, 1947 |
| 2,445,794 | Marsden | July 27, 1948 |
| 2,465,731 | Kropa | Mar. 29, 1949 |
| 2,486,162 | Hyde et al. | Oct. 25, 1949 |
| 2,505,431 | Rust et al. | Apr. 25, 1950 |
| 2,595,728 | Swiss et al. | May 6, 1952 |